United States Patent
Parson et al.

(10) Patent No.: US 9,879,196 B2
(45) Date of Patent: Jan. 30, 2018

(54) BODY OF MOLECULAR SIZED FUEL ADDITIVE

(71) Applicant: Efficient Fuel Solutions, LLC, Caddo, OK (US)

(72) Inventors: Bruce Briant Parson, Kanagawa (JP); Walter R. May, Houston, TX (US)

(*) Notice: Subject to any disclaimer, the term of this patent is extended or adjusted under 35 U.S.C. 154(b) by 0 days.

(21) Appl. No.: 14/417,541

(22) PCT Filed: May 31, 2013

(86) PCT No.: PCT/JP2013/065898
§ 371 (c)(1),
(2) Date: Jan. 26, 2015

(87) PCT Pub. No.: WO2014/017185
PCT Pub. Date: Jan. 30, 2014

(65) Prior Publication Data
US 2015/0210947 A1    Jul. 30, 2015

Related U.S. Application Data

(60) Provisional application No. 61/850,897, filed on Feb. 26, 2013, provisional application No. 61/741,686, filed on Jul. 26, 2012.

(51) Int. Cl.
*C10L 10/02*    (2006.01)
*F23D 17/00*    (2006.01)
(Continued)

(52) U.S. Cl.
CPC .............. *C10L 10/02* (2013.01); *C10G 29/04* (2013.01); *C10G 29/16* (2013.01); *C10L 1/10* (2013.01);
(Continued)

(58) Field of Classification Search
CPC ................. C10L 1/30; C10L 3/06; C10L 3/10
(Continued)

(56) References Cited

U.S. PATENT DOCUMENTS 3,332,755 A    7/1967   Kukin
4,104,180 A    8/1978   Burnop
(Continued)

FOREIGN PATENT DOCUMENTS

CN    1439696    9/2003
CN    1521245    8/2004
(Continued)

OTHER PUBLICATIONS

International Preliminary Report on Patentability for PCT Patent Application No. PCT/JP2013/065898 dated Jul. 5, 2014, 15 pages.
(Continued)

*Primary Examiner* — Ellen M McAvoy
(74) *Attorney, Agent, or Firm* — Margaret S. Millikin

(57) ABSTRACT

This invention generally refers to a new generation of fuel additives which can provide catalytic action to improve the combustion process of fossil fuels and to a catalyst among others containing an iron compound combined with an over-based magnesium compound with molecular size particles inside the combustion chamber. Such fuel additive catalysts are particularly useful for fuel oil combustion, natural gas combustion, stationary gas turbines, natural gas-fired reciprocating engines, diesel engines, gasoline engines and all stationary dual-fuel engines.

61 Claims, 6 Drawing Sheets

(51) Int. Cl.

| | | |
|---|---|---|
| C10G 29/04 | (2006.01) | |
| C10G 29/16 | (2006.01) | |
| C10L 1/10 | (2006.01) | |
| C10L 1/30 | (2006.01) | |
| C10L 3/00 | (2006.01) | |
| C10L 9/10 | (2006.01) | |
| C10L 1/16 | (2006.01) | |
| C10L 1/24 | (2006.01) | |
| C10L 3/06 | (2006.01) | |
| C10L 3/10 | (2006.01) | |
| C10L 10/08 | (2006.01) | |
| C10L 10/12 | (2006.01) | |
| F02C 3/22 | (2006.01) | |
| C10L 1/12 | (2006.01) | |
| C10L 1/188 | (2006.01) | |

(52) U.S. Cl.
CPC ........ *C10L 1/12* (2013.01); *C10L 1/16* (2013.01); *C10L 1/24* (2013.01); *C10L 1/30* (2013.01); *C10L 1/301* (2013.01); *C10L 3/003* (2013.01); *C10L 3/06* (2013.01); *C10L 3/10* (2013.01); *C10L 9/10* (2013.01); *C10L 10/08* (2013.01); *C10L 10/12* (2013.01); *F02C 3/22* (2013.01); *F23D 17/00* (2013.01); *C10G 2300/405* (2013.01); *C10G 2400/02* (2013.01); *C10G 2400/06* (2013.01); *C10L 1/1233* (2013.01); *C10L 1/1608* (2013.01); *C10L 1/1616* (2013.01); *C10L 1/1881* (2013.01); *C10L 1/1886* (2013.01); *C10L 1/2437* (2013.01); *C10L 1/305* (2013.01); *C10L 2200/024* (2013.01); *C10L 2200/029* (2013.01); *C10L 2200/0213* (2013.01); *C10L 2200/0263* (2013.01); *C10L 2200/0438* (2013.01); *C10L 2200/0446* (2013.01); *C10L 2230/04* (2013.01); *C10L 2230/22* (2013.01); *C10L 2270/026* (2013.01); *C10L 2270/04* (2013.01); *C10L 2290/141* (2013.01); *C10L 2290/60* (2013.01); *F23K 2201/505* (2013.01); *F23K 2900/05081* (2013.01); *Y02E 50/12* (2013.01)

(58) Field of Classification Search
USPC .............................. 44/321, 354–368
See application file for complete search history.

(56) References Cited

U.S. PATENT DOCUMENTS

| | | | |
|---|---|---|---|
| 4,509,956 A | 4/1985 | Braid et al. | |
| 4,979,447 A | 12/1990 | Farrar | |
| 5,145,488 A | 9/1992 | Weber | |
| 5,232,888 A | 8/1993 | Kamo | |
| 5,580,359 A * | 12/1996 | Wright | C10L 10/02 431/4 |
| 6,176,701 B1 * | 1/2001 | Robinson | C10L 1/12 431/12 |
| 6,866,010 B2 | 3/2005 | May | |
| 6,881,235 B2 | 4/2005 | May | |
| 6,948,926 B2 * | 9/2005 | Valentine | C10L 1/10 123/1 A |
| 6,986,327 B2 | 1/2006 | May | |
| 7,195,653 B2 * | 3/2007 | Hazarika | C10L 1/10 44/351 |
| 7,229,482 B2 | 6/2007 | May | |
| 7,276,094 B2 * | 10/2007 | Factor | C10L 1/14 431/2 |
| 7,524,340 B2 | 4/2009 | May | |
| 7,794,512 B2 * | 9/2010 | Aradi | B01D 53/9445 44/354 |
| 8,088,184 B2 * | 1/2012 | Hughes | B01J 13/0026 44/354 |
| 8,163,042 B2 * | 4/2012 | Rao | C10L 3/003 44/358 |
| 8,257,450 B2 * | 9/2012 | Aradi | B03C 3/013 44/359 |
| 2001/0034001 A1 | 10/2001 | Poe et al. | |
| 2003/0015456 A1 | 1/2003 | May | |
| 2003/0192232 A1 | 10/2003 | May | |
| 2003/0196371 A1 | 10/2003 | May | |
| 2004/0248054 A1 | 12/2004 | Poe et al. | |
| 2005/0188605 A1 * | 9/2005 | Valentine | C10L 1/10 44/321 |
| 2006/0025301 A1 * | 2/2006 | Reddy | B01J 21/063 502/304 |
| 2006/0175230 A1 | 8/2006 | Zhou | |
| 2008/0263940 A1 * | 10/2008 | Parish | C10L 1/305 44/354 |
| 2009/0000186 A1 * | 1/2009 | Sanders | C10L 1/10 44/321 |
| 2009/0013588 A1 | 1/2009 | Zhou | |
| 2011/0061291 A1 | 3/2011 | Mills | |
| 2011/0200507 A1 * | 8/2011 | Steiner | B01D 53/02 423/244.02 |
| 2011/0265372 A1 * | 11/2011 | Aradi | C10L 1/106 44/321 |
| 2011/0314833 A1 | 12/2011 | Symonds | |
| 2012/0102822 A1 * | 5/2012 | Holcomb | B01J 13/0017 44/301 |
| 2012/0136556 A1 | 5/2012 | Magnusson | |
| 2014/0007494 A1 * | 1/2014 | D'Alencon | B01J 13/0026 44/307 |
| 2014/0007495 A1 * | 1/2014 | D'Alencon | C10L 1/10 44/321 |

FOREIGN PATENT DOCUMENTS

| | | |
|---|---|---|
| CN | 1940034 | 4/2007 |
| CN | 101935556 | 1/2011 |
| CN | 102492504 | 6/2012 |
| EP | 1277827 | 1/2003 |
| GB | 2216138 | 10/1989 |
| JP | 3-244692 A | 10/1991 |
| JP | 2012-13077 | 1/2012 |
| WO | 2001063176 | 8/2001 |
| WO | 2003006587 | 1/2003 |
| WO | 2011002351 | 1/2011 |
| WO | 20110314833 | 12/2011 |
| WO | 2014017185 | 1/2014 |

OTHER PUBLICATIONS

May, W.R., et al., "Catalyst for Improving the Combustion Efficiency of Diesel Fuels", 9th Annual India Oil & Gas Review Symposium, Sep. 9-10, 2002, pp. 199-205.

May, W. "Reduction of Thermal and Prompt NOx in Exhausts of Natural Gas Fueled Boilers©", SFA International, Oct. 9, 2012, 29 pages.

May, W., "Fuel Ignition Analysis as Method for Determining Catalyst Activity in Liquid Hydrocarbon Fuels", [retrieved on Jan. 26, 2015], [retreived from internet URL : http://www.fuelspec.com/library/article-Fuel%20Ignition%20Analysis.pdf], 33 pages.

May, W., & Lang, J., "The Function of Fuel Borne Metallic Catalysts in the Reduction of Thermal and Prompt NOx In Exhausts of Natural Gas Fuel Engines" [retrieved on Jan. 26, 2015], [retrieved from the internet URL : http:www.fuelspec.com/library/The%20Role%20of%20Fuel%20Borne%20Metallic%20Catalysts%20in%20Inhibition%20of%20NOx%20Formation%20During%20the%20Combustion%20of%20Hydrocarbon%20Fuels.pdf], 26 pages.

May, W., "The Technological Contributions of SFA International, Inc. to Combustion Catalyst Technology—1996 to 2012© 1", SFA International, Inc., Oct. 2012, 11 pages.

May, W., "Marine Emissions Abetement", SFA International, Inc., [retrieved on Jan. 26, 2015], [retrieved from internet URL : http://

(56) References Cited

OTHER PUBLICATIONS www.fuelspec.com/library/Marine%20Emissions%20Abatement. pdf], 12 pages.
May, W., "Nitrogen Oxide Suppression with Combustion Catalysts", [retreived on Jan. 26, 2015], [retreived from internet URL : http://www.fuelspec.com/library/NOx%20Supression%20with %20Combustion%20Catalysts.pdf], 14 pages.
May, W., "Solubility of Ferrocene in Organic Solvents", [retrieved on Jan. 26, 2015], [retrieved from Internet URL : http://www. fuelspec.com/library/Solubility%20of%20Ferrocene%20in %20Organic%20Solvents%20with%20pictures.pdf], 10 pages.
May, W., "Effects of High Molecular Weight Condensed Molecules on Catalyzed Combustion Reaction Rates", SFA International, Inc., [retreived on Jan. 26, 2015], [retrieved from internet URL : http://www.fuelspec.com/library/article-condensed.pdf], 15 pages.
May, W., "Hydrocarbon Fuel Chemistry: Effects of Sulfur on Combustion Reaction Rates", SFA International, Inc., [retreived on Jan. 26, 2015], [retrieved from internet URL : http://www.fuelspec. com/library/article-Combustion.pdf], 16 pages.
May, W., & Hirs, E.A., "Catalyst for Improving the Combustion Efficiency of Petroleum Fuels in Diesel Engines", 11th Diesel Engine Emissions Reduction Conference, Aug. 21-25, 2005, Chicago, IL, 20 pages.
May, W., "Catalyst for Improving the Combustion Efficiency of Petroleum Fuels", Technical Exchange Meeting, ARAMCO Research & Development Center, Dhahram, Saudi Arabia, Apr. 28-30, 2003, 18 pages.
May, W., "Catalyst for Reducing Particulate Emissions in Combustion Turbine Engine Exhaust", [retreived on Jan. 26, 2015], [retrieved from internet URL : http://www.fuelspec.com/library/ Catalyst%20for%20Reducing%20Particulate%20Emissions %20from%20Combustion%20Turbine%20Engine%20Exhaust. pdf], 8 pages.
May, W., & Annand, R.R., "High-Temperature Corrosion in Gas Turbines and Steam Boilers by Fuel Impurities: I. Measurement of Nickel Allow Corrosion Rate in Molten Salts by Linear Polarization Technique", Ind. Eng. Chem. Prod. Res. Develop., vol. 11, No. 4, pp. 438-443, (1972).
May, W., Zetlmeisl, M.J., & Bsharah, L., "High-Temperature Corrosion in Gas Turbines and Steam Boilers by Fuel Impurities: II. The Sodium Sulfate-Magnesium Sulfate-Vanadium Pentoxide System", I&EC Product Research & Development, American Chemical Society, vol. 12, pp. 140-145, (1973).
May, W., Zetlmeisl, M.J., & Bsharah, L., "High-Temperature Corrosion in Gas Turbines and Steam Boilers by Fuel Impurities: III. Evaluation of Magnesium as a Corrosion Inhibitor", Ind. Eng. Chem. Res. Develop., vol. 12, No. 2, pp. 145-150, (1973).
May, W., et al., "High-Temperature Corrosion in Gas Turbines and Steam Boilers by Fuel Impurities: IV. Evaluation of Silicon and Magnesium Silicon as Corrosion Inhibitors", Journal of Engineering for Power, pp. 124-128, (Apr. 1974).
Zetlmeisl, M.J., May, W., & Annand, R.R., "May, W., Zetlmeisl, M.J., & Bsharah, L., High-Temperature Corrosion in Gas Turbines and Steam Boilers by Fuel Impurities: V. Lead Containing Slags", 74-WA/CD-4, Journal of Engineering for Power, pp. 1-7, (1974).
May, W., Zetlmeisl, M.J., Annand, R.R., May, W., Zetlmeisl, M.J., & Bsharah, L., "High-Temperature Corrosion in Gas Turbines and Steam Boilers by Fuel Impurities: VI. Statistical Study of the Effects of Sodium, Temperature and Additive on Corrosion Rate and Slag Friability", 75-WA/CD-5, Journal of Engineering Power, pp. 1-5, (1976).
May, W., Zetlmeisl, M.J., Annand, R.R., May, W., Zetlmeisl, M.J., & Bsharah, L., "High-Temperature Corrosion in Gas Turbines and Steam Boilers by Fuel Impurities: VII. Evaluation of Megnesium-Aluminum-Silicon Conbinations as Corrosion Inhibitors", 75-WA/ CD-6, Journal of Engineering Power, pp. 1-5, (1976).
May, W., et al., May, W., Zetlmeisl, M.J., Annand, R.R., May, W., Zetlmeisl, M.J., & Bsharah, L., "High-Temperature Corrosion in Gas Turbines and Steam Boilers by Fuel Impurities: VIII. Evaluation of the effects of Maganese, Calcium, and Several Heavy metals as Corrosion and Slag Formation", American Chemical Society Division of Fuel Chemistry, Inc., Symposium on Heavy Fuel Oil Additives, New York, NY, Apr. 5, 1976, 11 pages.

\* cited by examiner

BODY OF MOLECULAR SIZED FUEL ADDITIVE

CROSS-REFERENCE TO RELATED APPLICATION

This application is a National Stage Application of International Application No. PCT/JP2013/065898 which claims the benefit of U.S. Provisional Application No. 61/850,897, filed on Feb. 26, 2013 and U.S. Provisional Application No. 61/741,686, filed Jul. 26, 2012, the entire contents of which are hereby incorporated by reference.

U.S. PATENT DOCUMENTS

| | | |
|---|---|---|
| 3,332,755 A | July 1967 | Kukin 44/603 |
| 4,104,180 A | August 1978 | Burnop 508-392 |
| 5,145,488 A | September 1992 | Weber |
| 6,866,010 B2 | March 2005 | May |
| 6,881,235 B2 | April 2005 | May |
| 6,986,327 B2 | January 2006 | May |
| 7,229,482 B2 | June 2007 | May |
| 7,524,340 B2 | April 2009 | May |

OTHER PUBLICATIONS

"Boiler Fuel Additives for Pollution Reduction and Energy Savings", ed. Eliot, 1978, pp. 67-72.

Rising, B., "Particulate Emission Reduction Using Additives," Technical Paper TP-98010, Jan. 9, 1998, Westinghouse Power Corp., Orlando, Fla. 32826-2399.

May, W., "Combustion Turbine Exhaust Particulate Emission Reduction: A Mechanistic Discussion," June 2002.

May, W., "Catalyst for Improving the combustion Efficiency of Diesel Fuels," India Oil and Gas Review Symposium," September 2002.

Flame Emission Spectroscopy: Fundamentals and Applications

Giorgio Zizak Lecture given at the ICS Training Course on Laser Diagnostics of Combustion Processes, NILES, University of Cairo, Egypt, 18-22 Nov. 2000.

Synthesis of Novel Fuel Additives

Salal Abdulhadi Abdulla Murrhige and Ahmed Abdulamier hussain Al-Amiery 2010; 2(5)

Biochemical division, Department of applied science, University of Technology, Iraq

TECHNICAL FIELD

This invention generally refers to a new generation of fuel additives which can provide catalytic action to improve the combustion process of fossil fuels and to a catalyst among others containing an iron compound combined with an over-based magnesium compound with molecular size particles inside the combustion chamber. Such fuel additive catalysts are particularly useful for fuel oil combustion, natural gas combustion, stationary gas turbines, natural gas-fired reciprocating engines, diesel engines, gasoline engines and all stationary dual-fuel engines. The catalyst decreases critical exhaust emissions such as NOx, carbon monoxide, and particulates at the same time improving fuel efficiency of the combustion process involved. Although the catalyst adds some metallic ash to the exhaust of various combustion processes, the amount of such ash and the size of the ash particles is reduced to the point of inconsequence.

Recent changes to distillate fuel oils, including diesel fuel, involve a major reduction of the amount of sulfur to what is called low-sulfur or ultra-low sulfur distillate fuels. During the distillation process of making such fuels, the lubricity of the fuel is diminished to such a level that it can cause major problems with fuel injection systems. One embodiment of the catalyst of the current invention addresses the problem by adding a lubricity agent to the fuel additive that restores lost lubricity.

BACKGROUND OF THE INVENTION

The most commonly used fossil fuels are natural gas, gasoline, distillate fuel oils, and coal. The need to reduce consumption of such fuels and to simultaneously reduce pollutants from the exhaust gas resulting from fuel combustion is a major challenge.

Fuel additives of the prior art are generally limited to use in liquid fossil fuels to include gasoline and distillate fuel oils. Although the benefits of using a metallic catalyst containing iron and over-based magnesium are well known to those skilled in the art, prior art has been limited to concentrations of iron from about 30 PPM to 70 PPM by weight and magnesium content about 1 part by weight of magnesium to every 3 to 8 parts of iron. The average particle size was also limited to about 0.007 microns. The resultant high ash content, although often within the ASTM specification, and the large particle size of the prior art are limitations of the previous art. Such large particle sizes, aside from adding costs to the additive, also introduce metallic particles into the air at a level higher than that recommended by the US Environmental Protection Agency.

What is needed is a new catalyst fuel additive which can be utilized in a wider variety of fossil fuels, has such low particle density and particle size that damage to equipment using the additive is virtually eliminated and any metallic ash released into the atmosphere is considerably below current EPA recommended standards.

The types of combustion processes which can utilize such catalysts include but are not limited to distillate fuel oil burned by combustion processes, natural gas combustion, stationary natural gas turbines, natural gas-fired reciprocating engines, gasoline and diesel engines, large stationary diesel and all stationary dual-fuel engines. The lower the concentration of metallic ash and the smaller the particle size, the lower the risks to the environment and equipment in which the natural gas is combusted.

SUMMARY OF THE INVENTION

The present invention includes fuel additive catalysts for use with fossil fuels which includes additive particle sizes of molecular size. It includes compositions of a large number of metals, metal oxides, and metallic compounds as components of these fuel additives. It includes applications of such fuel additives to fossil fuels including natural gas, gasoline, diesel fuels, distillate fuels, and coal. The small particle sizes provide the same quality of catalysis with a significantly reduced risk of pollution or damage to the combustion equipment utilizing the additive.

In another preferred embodiment a wide variety of metals, metal oxides, and metallic compounds used for fuel additives are chosen so that gaps in the combined fluorescent emission spectrum over important spectral bands from wavelengths of 200 to 2500 nm are minimized by adding metals, metal oxides, and metallic compounds chosen so that gaps in the emission spectra of the combined metals are minimized. Such minimization improves reduction of NOx emissions and promotes more complete combustion of the fossil fuels.

In another preferred embodiment additional lubricity agents are added to the fuel catalysts of the present invention for the purpose of reducing wear on engine parts from lubricity which is reduced during the process of refining petroleum to become low or ultra-low sulfur diesel or distillate fuels.

In another preferred embodiment the fuel additive of the current invention is used together with exhaust gas recirculation or Selective Catalytic Reduction to further reduce NOx and carbon monoxide emissions and to improve fuel efficiency for combustion processes utilizing fossil fuels.

Applications of such fuel additives to a wide variety natural gas, gasoline, distillate oil and diesel fuels combustion processes in a wide variety of industrial, commercial and residential uses are included.

DETAILED DESCRIPTION OF THE INVENTION

Figure 1:
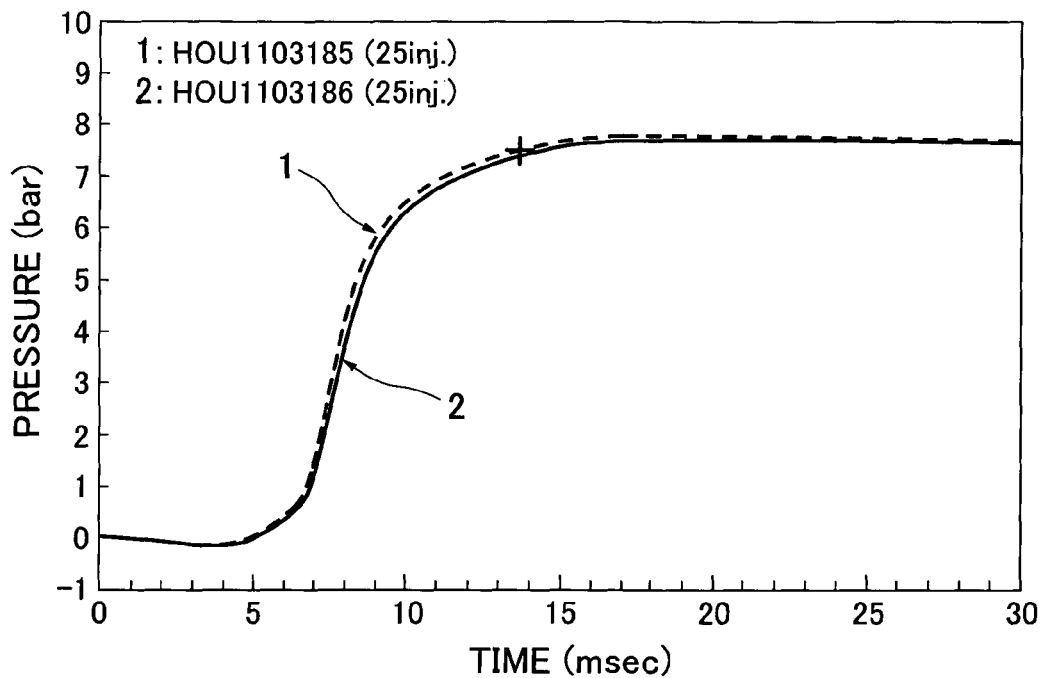
FIG. 1 a graphical presentation of the test results of Method IP 541/06 testing.

In general experimental measurements of thermal $NO_x$ formation have shown that NOx concentration is exponentially dependent on temperature, and proportional to $N_2$ concentration in the flame, the square root of $O_2$ concentration in the flame, and the peak temperature combustion residence time. Thus, the formation of thermal NOx is affected by four factors: (1) peak temperature, (2) fuel nitrogen concentration, (3) oxygen concentration, and (4) time of exposure at peak temperature. NOx is of major concern in industrialized countries as it is one of the chief contributors to acid rain. Considerable effort and cost has been applied to reducing NOx in all combustion environments utilizing fossil fuels. Thermal fixation is the dominant NOx-forming mechanism in units firing No. 1 and No. 2 distillate oils including low and ultra-low sulfur distillate fuels as well as natural gas primarily because of the negligible nitrogen content in these lighter oils, in natural gas. Heavier distillate fuels and coal have considerably more severe NOx issues than the lighter fuels and natural gas.

Prior art formulations of iron/magnesium fuel additives had minimum average particle sizes of about 0.007 microns and were used in liquid fuels at a preferred rate of 30-75 PPM of iron and 6-16 PPM of magnesium by weight. Thus the total metallic ash added to the fuel could be as high as 90 PPM.

The EPA in 1996 started a procedure which would place limits on metals used in fuel additives. Specifically they found that aluminum, boron, calcium, sodium, zinc, magnesium, phosphorus, potassium and iron could be present in levels up to 25 PPM by weight and not cause health problems in the atmosphere. EPA estimates that a concentration of 25 parts per million (ppm) of atypical element(s) in a base fuel should generally yield a non-toxic concentration in air of less than 0.1 $mg/m^3$. In one embodiment of the current invention as shown in example 2, the iron component of the fuel additive catalyst uses less than 2 ppm or by weight which is less than $1/10^{th}$ the EPA recommended maximum concentration lowering the already low potential for any health problems in the atmosphere. The magnesium content is $1/5^{th}$ of the iron by weight which makes it even less of an issue from as a health problem.

One preferred embodiment of the current fuel additive catalyst composition comprises an iron based compound, a magnesium based compound and a carrier liquid into which the iron and magnesium compounds are added. Preferably the carrier liquid will be a solvent into which the iron compound will dissolve. A solution will allow for maximum distribution of the iron compound and the minimum molecular size particles. The magnesium compound may be either dissolved by or form a colloidal suspension or dispersion with the carrier liquid solvent.

Various flash point solvents are possible solvents available as the carrier solvent liquid including but not limited to toluene, hexanol, octanol, xylene, kerosene, fuel oil, Aromatic or Solvent series naphtha solvents, and petroleum spirits or their equivalents.

In one embodiment of the fuel additive catalyst the liquid carrier is chosen from one of the naphtha solvents with flash points as low as 108 degrees F. and as high as 200 degrees F. readily available in the market under various brand names. Ferrocene will dissolve in such solvent in molecular form. For application with diesel fuels Aromatic 150, a product of Al Chem Chemical Company, 5280 Tulane Dr. SW, Atlanta, Ga. or its equivalent is preferred. When the flash point of the carrier fluid is an issue in a fossil fuel burner application, any of the Aromatic series or the equivalent can be used.

In another embodiment of the current invention iron is used in the form of dicyclopentadienyl iron or "ferrocene". For purposes of this invention ferrocene includes all of its derivatives well known to those skilled in the art including dicyclopentadienyl $Fe^0$ as well as cyclopentadienyl triscarbonyl $Fe^0$ and mixtures thereof. Additionally the oil-soluble compounds that can be used include iron carboxylate, dicarboxylate, sulfonate, citrate, naphthenate, and chelating compounds such as ethylene diamine tetracetic acid. The ferrocene is dissolved in the solvent xylene before being introduced into the combustion process. Using a solution of ferrocene decreases the particle size to molecular size particles. The magnesium compound is over-based and in the form of magnesium sulfonate (magnesium oxide and carbonate suspended at the colloidal level and partially reacted with sulfonic and carboxylic acids) as will be understood by those skilled in the art. In one embodiment the magnesium sulfonate forms a colloidal suspension with the carrier fluid, xylene.

In another embodiment it is well known that magnesium laurate, magnesium arachidate, magnesium plamitate, magnesium oleate and magnestium stearate are all soluble in xylene. Thus both iron and magnesium compounds are dissolved in the carrier solvent. As such these compounds can be used to introduce molecular size compounds of magnesium directly into the carrier fluid xylene or other preferred carrier fluids of the fuel additive of the current invention.

In one embodiment of the catalyst fuel additive of the current invention contains at least two metals, metallic oxides or metallic compounds the particles of which are molecular size inside the combustion chamber can be used for any of a number of fossil fuel applications. For each application special considerations are needed to insure even distribution of the catalyst throughout the combustion process.

For purposes of this invention distillate fuel oil is a general classification for one of the petroleum fractions produced in conventional distillation operations. It includes diesel fuels and fuel oils. Products known as No. 1, No. 2, and No. 4 diesel fuel are used in on-highway diesel engines, such as those in trucks and automobiles, as well as off-highway engines, such as those in railroad locomotives and agricultural machinery. Products known as No. 1, No. 2, and No. 4 fuel oils are used primarily for space heating and electric power generation. Fuel oils also include heavier fuel oils known as No. 5 and No. 6 which have multiple uses. The catalyst fuel additive of the current invention includes can be used in all distillate fuel oil combustion processes.

For purposes of this invention the uses of distillate fuel oils are herein detailed. Residential applications include all energy consumption of living quarters for private households. Common uses are space heating, water heating, air conditioning, lighting, refrigeration, and cooking. Commercial energy consumption includes that of service-providing facilities and equipment of nonmanufacturing businesses: Federal, State and local governments; and other private organizations such as religious, social or fraternal groups, hospitals, schools and universities. Industrial applications include all facilities and equipment used for producing, processing or assembling goods covering manufacturing and mining. Farm applications include establishments whose primary activity is growing crops or raising animals. Electric power generation is an energy-consuming sector primarily for the production of electricity and combines heat and power (CHP) plants whose primary business is to sell electricity, or electricity and heat to the public. Railroad applications are another energy-consuming sector that includes all railroads for any use. Vessel bunkering is another energy-consuming sector that consists of commercial or private boats, such as pleasure craft, fishing boats, tugboats, and ocean-going vessels, including vessels operated by oil companies. The military applications sector is an energy consuming sector including the US Armed Forces, Defense Energy Support Center (DESC) and all branches of the Department of Defense. Off-highway is an energy-consuming sector consisting of construction equipment and facilities and equipment including earthmoving equipment, cranes, stationary generators, air compressors, etc. Other off-highway uses aside construction include logging, scrap and junk yards, and refrigeration units on trucks.

Ultra-low sulfur diesel (ULSD) is a standard for defining diesel fuel with substantially lowered sulfur contents. The EPA of the US mandated the use of ULSD fuel in model year 2007 and newer highway diesel fuel engines equipped with advanced emission control systems that require the new fuel. These advanced emission control technologies will be required for marine diesel engines in 2014 and for locomotives in 2015. The new allowable sulfur content for ULSD (15 ppm) is much lower than the previous U.S. on-highway standard for low sulfur diesel (LSD, 500 ppm) which allows advanced emission control systems to be fitted that would otherwise be poisoned by these compounds. Many actual fuels being used in North America have sulfur in the range of 10 ppm. These systems can greatly reduce emissions of oxides of nitrogen and particulate matter.

In one embodiment when the fuel additive catalyst is injected into a stream of natural gas prior to entering the combustion process, the carrier liquid is chosen to provide immediate evaporation upon introduction into the gas stream allowing even distribution of the catalyst prior to entering the combustion chamber. The ferrocene is dissolved in the xylene and the magnesium sulfonate compound forms a colloidal suspension or dispersion with the xylene or alternatively a compound of magnesium which can be dissolved in xylene. Xylene can also be used as the carrier liquid for liquid fuels including but not limited to diesel fuel, gasoline and distillate fuels and can also be injected directly into a coal burning furnace. The flash point of xylene is between about 81 and 90 degrees F.

In one embodiment of the current invention when iron in the form of ferrocene is dissolved it is of molecular size. When the ferrocene enters the flame, the hydrocarbon portion of the ferrocene molecule is burned away leaving an iron oxide molecule in its place. Hence there is a significant decrease in the particle size of the iron compound in the flame to that of molecular size less than one micrometer in size.

Over-based magnesium is the second metallic compound used in the form of magnesium sulfonate (magnesium oxide and carbonate suspended at the colloidal level and partially reacted with sulfonic and carboxylic acids) which forms a colloidal suspension with the liquid carrier xylene. When magnesium sulfonate particles enter the flame the organic moiety burns away leaving magnesium oxide in the combustion chamber with more than 50% of the particles of molecular size, the prevalent magnesium molecule being MgO. Clearly more than 50% of the combined iron oxide and magnesium particles in the combustion chamber are molecular in size, the prevalent molecule being $Fe_2O_3$. In one embodiment xylene is used as the carrier fluid, however any of the prior mentioned carrier fluids will suffice.

In another embodiment it is well known that magnesium laurate, magnesium arachidate, magnesium plamitate, magnesium oleate and magnestium stearate as well as other compounds of magnesium are all highly soluble in xylene. As such these compounds can be used to introduce molecular size compounds of magnesium directly into the carrier fluid xylene of the fuel additive of the current invention. In that case magnesium compounds can be found in the carrier fluid in molecular size particles.

The ratio of magnesium to iron content by weight is 5 parts of iron to 1 part of magnesium by weight, although concentrations of between 3 and 8 of iron are also acceptable. Testing of this additive against the prior art formulation showed that for similar catalyst performance a total of 1.76 PPM by weight of iron and magnesium provided the same quantitative performance as the prior art which had an average particle size less than about 0.007 microns and a particle content of 60 PPM or higher by weight of iron and magnesium together. The range of concentration of iron and magnesium by weight in the fuel additive of the current invention can be as low as about 0.1 PPM and as high as 15 PPM and still provide catalytic action.

In yet another embodiment of the current invention copper oxide with a high percentage of molecular size particles is added to the combustion chamber of the fossil fuel by adding to the fuel additive a copper compound soluble in xylene. Such compounds are well known by those skilled in the art and include but are not limited to over-based naphthenates of copper and copper II benzoylacetonate. Because the copper compound is dissolved clearly more than 50% of the particles in the combustion flame have molecular sized particles. The copper compound will oxidize when it is combusted inside the combustion flame leaving copper oxide particles inside the combustion zone. The amount of copper to be utilized depends on many aspects of the fossil fuel and combustion process in with the fuel additive is used. Although the ratio of iron to magnesium is generally stable between a ratio of 1 part magnesium to as few as 3 parts and as many as 8 parts of iron, copper can be varied significantly to meet specific fuel and combustion process applications from a minimum of about 0.1 to a maximum of less than 3 parts which is less than the iron content. In one embodiment of the current invention copper compounds which form a colloidal suspension in the carrier fluid may also be used. Such copper compounds will combust inside the combustion zone becoming copper oxide particles. Although copper was used as an example, any metal, metallic oxide or metallic compound which is spectrally complementary with either iron, magnesium, or both over the wavelength band from 200 to 2500 nm can be used as well.

Although iron, magnesium and copper have been used here as examples of the metals, metal oxides, or metal compounds used in the current invention whose particle size in the combustion chamber is molecular size, other metals, metal oxides or metal compounds may also be used chosen from any of aluminum, antimony, molybdenum, tin, boron, bismuth, calcium, cerium, lithium, sodium, potassium, barium, manganese, silicon, copper, cadmium, cobalt, nickel, chromium, titanium, rhodium, palladium, platinum, ruthenium, osmium, silver, titanium, strontium, yttrium, zirconium, indium, tungsten, barium, phosphorus, scandium, tantalum, lanthanum, ytterbium, lutetium, rubidium, vanadium, and zinc.

Example 1 below quantifies the amount of decrease in maximum temperature achieved as a function of time in a diesel simulation test while also shifting the peak temperature achieved compared to fuel not containing the fuel additive.

Example 1

A standardized test procedure known as Method IP 541/06 was used to compare the combustion characteristics of a fuel additive using a ratio of iron compound to over-based magnesium compound of five parts of iron to one part of magnesium. In this test the particle size and hence amount of iron and magnesium is somewhat higher than that of the current invention, but those skilled in the art will realize that the effect on reducing NOx pollution is not significantly altered by the particle size.

The test consists of injecting a small sample of fuel into a heated pressurized cylinder emulating the compression stroke of a compression-ignited reciprocating diesel engine. The primary difference is that the volume remains constant whereas in a reciprocating engine, the volume increases. All times are in milliseconds from injection of fuel. Fuel is injected in milligrams; it can be assumed that there is a large excess of oxygen and reaction kinetics are reduced to pseudo zero order. The following measurements were taken:

Ignition Delay: The time when pressure increases by 0.2 millibars pressure.

Main Combustion Delay: The time when a pressure of 3.0 millibars is measured.

End of Main Combustion: The time when pressure reaches 85% of final pressure.

End of Combustion: The time when 95% of final pressure is reached.

A sample of high sulfur residual oil from Panama was used with about 2.5% sulfur and 11.9% carbon residue indicating a reasonably high aromatic content. Flash point was 94° indicating high molecular weights. The density was 0.986 gm/cc.

TABLE 1

| Parameter | Description | w/o Catalyst* | w/ Catalyst* |
|---|---|---|---|
| ID | Ignition Delay | 5.2 | 5.36 |
| MCD | Main Combustion Delay | 6.72 | 6.81 |
| PCP | Pre-combustion Period | 1.46 | 1.45 |
| EMC | End of Main Combustion | 11.31 | 11.65 |
| EC | End of Combustion | 15.47 | 16.06 |
| MCP | Main Combustion Period | 4.6 | 4.84 |
| ABP | After-Burning Period | 4.16 | 4.41 |

*Units in milliseconds

FIG. 1 shows the average of 25 test runs of the fuel without a fuel catalyst 1 and 25 test runs using the fuel catalyst 2 described above. The vertical axis represents pressure inside the combustion vessel and the horizontal axis the time in milliseconds after injection of the fuel. Although measurements were made as a function of change in pressure with time, from the ideal gas law we can assume that the temperature in absolute degrees is proportional to the pressure and hence make a direct correlation of pressure to absolute temperature.

Figure 2:
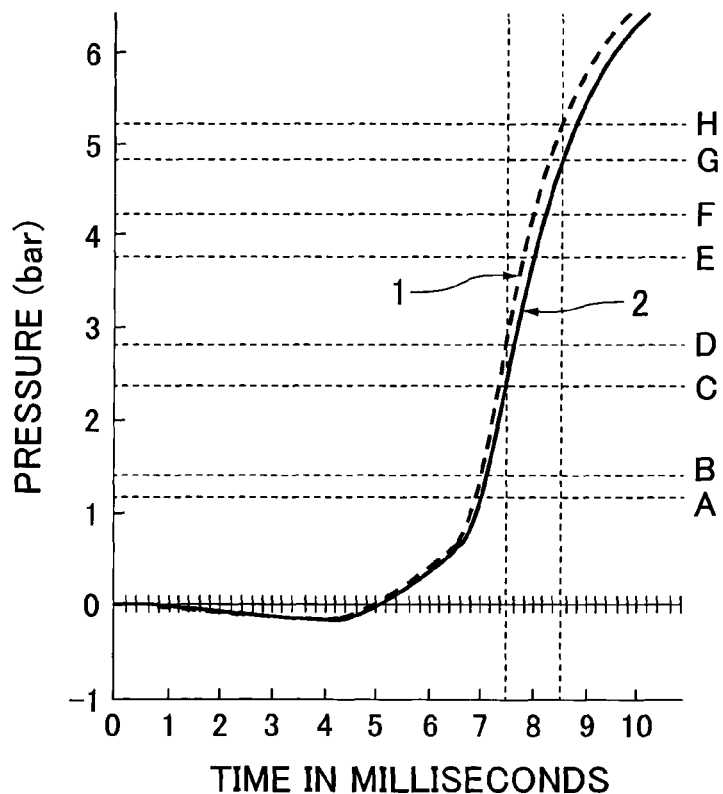
FIG. 2 a large scale graphical presentation of the test results of Method IP 541/06 testing.

In an effort to show the maximum rate of change and also maximum temperature reached by the flame of this test, FIG. 2 shows a closer view of the curve in FIG. 1 where the rate of heat increase is considerably slower with the fuel containing the catalyst 2 than was the fuel containing no catalyst 1. When NO is produced the chemical reaction is highly exothermic. Hence the significantly slower rate of temperature rise indicates that there is considerably lower NO and hence NOx generated by the fuel containing the fuel catalyst. The lower temperature of the fuel with catalyst indicates low production of NOx. Flame temperatures shown at the same time after injection of the fuel are decreased considerably when the catalyst is added compared to no catalyst lowering NOx emissions.

Example 2

Three diesel trucks (oil tankers) operating on ultra-low sulfur fuel were given base line testing to determine fuel efficiency in miles per gallon, NOx emissions (ppm) and carbon monoxide emissions (ppm). NOx emissions and CO emissions were measured with a Testo t350 XL analyzer prior to use of the fuel additive of the current invention. A second test prior to fuel additive use was made of fuel efficiency for each of the three trucks. A minimum of 2000 miles were travelled and fuel consumption noted to establish baseline fuel consumption. These trucks were all equipped with SCR devices. All vehicles were operated on ultra-low sulfur content diesel fuel.

The catalyst used was an iron/over-based magnesium additive of the current invention with two different metallic ash contents, one where the metallic ash content was approximately 1.0 ppm and a second with approximately 2.0 ppm. Although metallic ash contents of 1.0 and 2.0 ppm were chosen for this test, the catalyst can be used with even lower ash content of about 0.5 PPM and as high as about 15 PPM by weight in other applications.

Initial testing included using a catalyst concentration of one catalyst ounce for every 60 gallons of ultra-low sulfur diesel fuel or a catalyst concentration by weight of approximately 0.88 PPM, an ash content less than 1 PPM and the particle size was molecular size for at least 50% of the iron compound dissolved in the solvent xylene. The iron compound used was ferrocene and the magnesium compound was magnesium sulfonate. After 4 weeks of operation calculations of fuel efficiency showed that the trucks averaged 7.4% fuel efficiency improvement. The concentration of fuel additive was increased to one ounce for every 30 gallons of fuel or 1.76 PPM by weight with an ash content of less than 3 PPM. The fuel efficiency increased to 11.6% higher than baseline and was consistently higher for each vehicle with increased catalyst concentrations. NOx levels were decreased an average of 56.9% and CO levels reduced an average 82.3% when tested with the Testo t350 XL analyzer at the end of the test run. Although measurements of particulate and smoke emissions were not recorded, driver comment indicated a decrease of those which is consistent with a decrease in CO emissions.

TABLE 2

| Truck Number | 1 | 2 | 3 |
|---|---|---|---|
| Without Additive | | | |
| Baseline Miles Travelled | 2,761 | 2,112 | 2,226 |
| Average Baseline MGP | 3.841 | 4.117 | 3.799 |
| Baseline NOx Emission (ppm) | 133 | 168 | 165 |
| Baseline CO emissions (ppm) | 368 | 278 | 145 |
| With Catalyst of Current Invention 1 oz per 60 Gallons (<1 ppm metallic ash) | | | |
| Miles Travelled with Catalyst | 4,709 | 5,441 | 7,053 |
| Average MPG with Additive | 4.100 | 4.329 | 4.144 |
| Percent Fuel Efficiency Improvement | +6.76% | +5.14% | +9.10% |
| With Catalyst of Current Invention 1 oz per 30 Gallons (<2 ppm metallic ash) | | | |
| Miles Travelled with Catalyst | 4,545 | 3,789 | 3,787 |
| Average MPG with Additive | 4.335 | 4.466 | 4.256 |
| Percent Fuel Efficiency Improvement | +12.87% | +8.47% | +12.04% |
| Percent NOx Reduction | −58.65% | −48.81% | −67.27% |
| Percent CO reduction | −98.1% | −52.88% | −98.62% |

Example 3

One embodiment of the fuel additive of the current invention has been tested in a low $NO_x$ natural gas fired boiler providing a rated 100 MW of electrical power to a vegetable processing plant. The burner employed fuel induced exhaust gas recirculation burners to reduce NOx. The burner requires 36% flue gas recirculation to reduce the $NO_x$ below the California Air Resources Board acceptable level of 7 ppm. That large amount of flue gas reduces the oxygen concentration to about 16-17% which caused the combustion to become unstable. Reducing the flue gas recirculation to 24% stabilized the burner but the $NO_x$ rose to a level of 10-11 ppm. The fuel additive of the current invention was infused into the natural gas as it entered the boiler and the $NO_x$ was reduced from 10-11 ppm to 5 ppm for a 50 to 55% reduction of $NO_x$ levels. The amount of additive required was 1.0+/−0.5 ppm iron by weight added to the natural gas fuel. Magnesium particles were in a ratio of 1:5 by weight to the iron particles. The preferred additive is dissolved or colloidally suspended in the carrier solvent xylene so that it can be injected into the natural gas fuel stream in such a way that intimate mixing occurs and carrier solvents are immediately removed by evaporation. Although fuel efficiency was not measured, natural gas burners generally run with about 5% fuel efficiency improvement as the same time lowering $NO_x$. The test of this natural gas application was repeated successfully 4 times.

Example 4

A natural gas engine, Caterpillar model 3516 1,340 HP spark-ignited unit, was equipped with emissions sensors. Excess air was controlled to meet emissions requirements. Although excess air (or lean burn) control can reduce NOx levels to acceptable levels, the engine will shut down under high load conditions. Using the catalyst of the current invention allowed the engine to operate at required maximum load under lean burn conditions that will reduce NOx production by >75%.

The engine was generating about 300 ppm NOx (2 gms./bhp-hr) under normal operating conditions. Catalyst was introduced into the engine. Initially, oxygen levels were manually increased to reduce NOx. With increase in oxygen to more lean burn conditions, the NOx reduced from 300 to 120 the first day. After about one week, the oxygen-fuel ratio was controlled by the NOx sensor to achieve 70 ppm or less NOx levels (0.5 gms./bhp-hr). The engine performed at high load conditions under these lean burn conditions demonstrating the effects of the catalyst. The oxygen levels were increased from 8.1% before catalyst use to 8.9% by using the catalyst.

A second test was conducted with the same model engine with an oxygen sensor in the exhaust and excess air control based on oxygen level in the exhaust. At the beginning of the test, the oxygen level was set at 7.5% for stable power at maximum load. The catalyst dosing system was connected to the intake manifold. Four measurements were taken to establish baseline conditions. NOx was in the 171 to 181 ppm range leading to 0.94 to 1.00 gm./bhp-hr levels. Catalyst addition was started following the last reading. The next morning measurements indicated that the NOx levels had dropped, NOx had reduced to the 78-91 ppm range or 0.43-0.67 gm./bhp-hr for a reduction of 48% at the same oxygen settings. Actual oxygen levels in the exhaust showed a slight increase from 7.80-7.95% the previous day to 7.91-8.09% range but nowhere near sufficient to explain the drop in NOx. The oxygen level was then increased to an 8.2% setting. NOx measurements taken one hour later were in the 55-57 ppm range or 0.31 gm/bhp-hr. The engine operated normally at full power loads with this high excess air or oxygen level. A significant reduction of NOx was observed without increasing excess air.

In one embodiment of the current invention any of a number of lubricity agents available in the market may be added to the fuel additives of the current invention. Any such lubricity agent that has an ASTM D 6079 HFRR average wear scar diameter not greater than 400 microns will suffice.

Preferably the lubricity agent will have an average wear scar diameter less than 270 microns.

Figure 3:
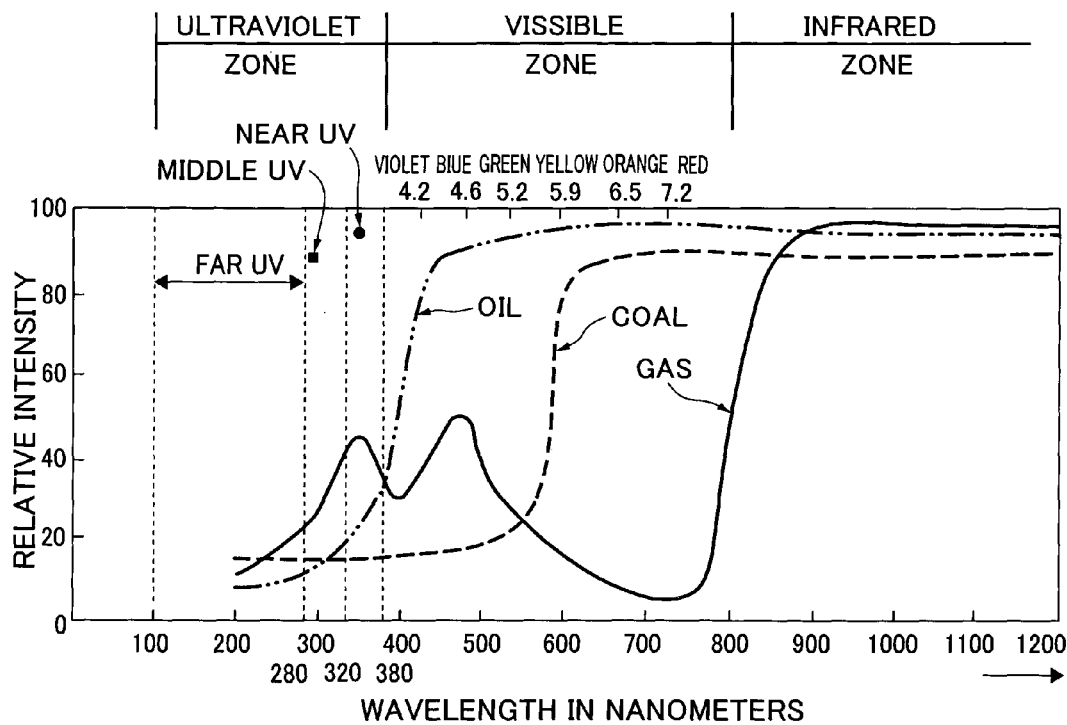
FIG. 3 is a general graphical representation of the output flame spectra of coal, gas and oil combustion.

FIG. 3 demonstrates the general spectral emissions from combustion of various fuels that are oil based, coal based and gas based. Although the specific spectrum differ, by choosing the proper metals, metal oxides, or metallic compounds for the fuel additive, optimal catalytic action can be obtained for each fuel used as will be well understood by those skilled in the art. Each wavelength shown on the horizontal axis has a corresponding Wien temperature which is a measure of the temperature associated with each emission line.

Figure 4:
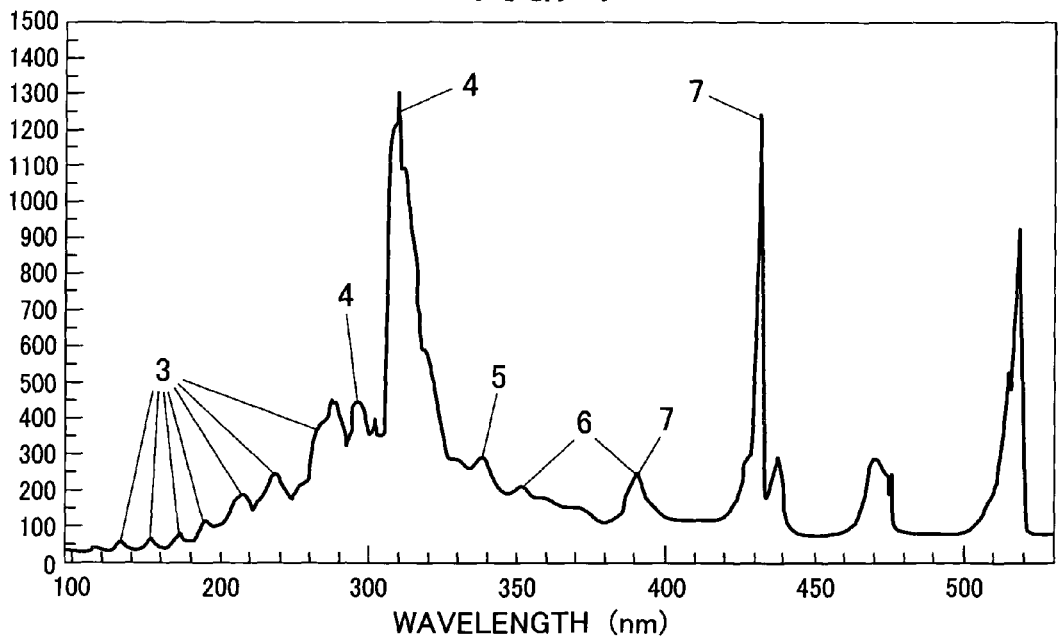
FIG. 4 is a graphical representation of the output flame spectra of butane fuel in ultraviolet and light energies.

FIG. 4 is taken from measurements of emission spectra from a butane flame. This illustrates the wavelengths and subsequent Wien temperatures at which various reactions in the process of producing NOx emissions are produced by any of the fossil fuels of the current invention. NOx is one of the primary contributors to photochemical smog. Wien's displacement law describes the maximum wavelength of electromagnetic radiation that an object emits based on it's temperature. It is well known that six reactions are responsible for the formation of NOx: $N_2+O \rightarrow NO+N$; $N_2+CH \rightarrow HCN+N$; $HCN+O \rightarrow NCO+H$; $NCO+H \rightarrow NH+CO$; $NH+OH \rightarrow NO+H$; and $N+OH \rightarrow NO+H$. Just as the oxidation of fossil fuels involves many intermediate steps and various radical species, so does the formation of NOx. From the reaction steps it is apparent that the radical species OH4, NH5, CN6 and CH7 are intimately involved in the mechanisms that produce NO3, and that their presence should serve as an indicator of NOx formation. When NO3 molecules are produced very high energy photons are released at wavelengths between 215 and 290 nm with Wien temperatures between 13,474 K and 9,990 K. Similarly NH5 produces photons of wavelengths 335 to 345 nm with Wien temperatures between 8,648 K and 8,397K, OH4 photons of wavelengths 305 to 330 nm with Wien temperatures between 9,498 K and 8,778 K, CH7 photons of wavelengths 380 to 400 with Wien temperatures between 7,624 K and 7,243 K as well as 420 to 440 nm with Wien temperatures between 6,898 K and 6,584 K, and CN6 photons of wavelengths 340 to 360 nm with Wien temperatures between 8,520 K and 8,047 K as well as 380 to 400 with Wien temperatures between 7,624 K and 7,243 K.

It is well known by those skilled in the art that there is a high correlation between high temperature flue gas with high amounts of NOx and high amounts of NH 5/CN 6 photon emissions in their combustion spectrum. Although the amount of combustion that contributes to these high temperatures is typically less than 1% of the total energy of combustion, the influence on NOx production is significant. It is also well understood that NO2 emissions are also influenced by high amounts of CN photon emissions. Production of NOx is dependent on especially high localized temperatures inside the flame and the time that those temperatures are present. In one embodiment of the fuel additive catalyst of the current invention iron in the form of $Fe_2O_3$ inside the combustion envelope is used together with MgO to reduce the NOx emissions.

Spectral data for various metals according to the valences have been taken from the NIST Atomic Spectra Database Lines Form. Since emission intensities vary significantly between spectra of different metals, the relative spectral intensities given by the NIST database has meaning only when comparing the intensities of spectral lines of the same metal. For that reason spectral lines are normalized so that the total emission intensities for any particular metal and its appropriate valence summed over the total wavelengths between 180 nm and 2500 nm are equal to 1.0.

Figure 5:
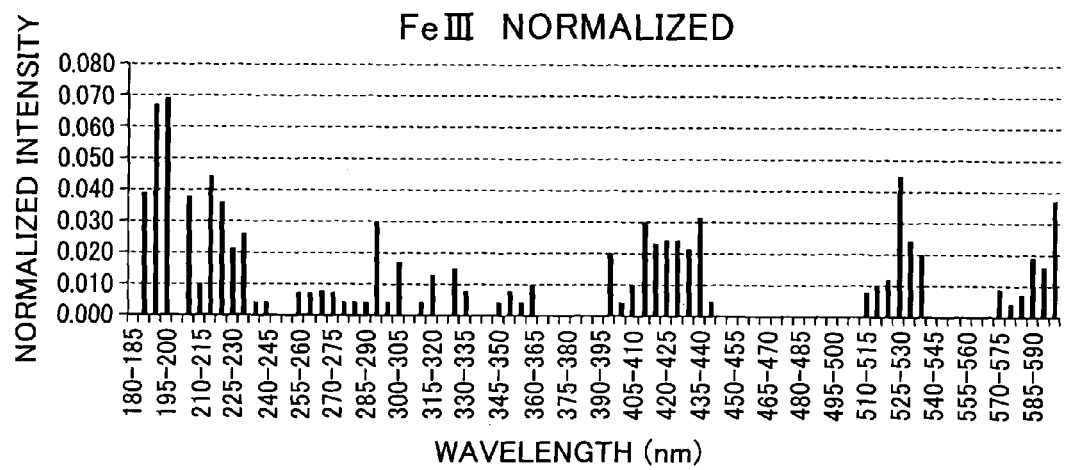
FIG. 5 is graphical representation of normalized emission spectra for Iron III in the wavelength band from 200-600 nm.

FIG. 5 represents the spectral emission lines of iron from wavelengths of 180 nm to 610 nm. Although the operation of the additive of the current invention is not bound by any theory it is believed that $Fe_2O_3$ molecules are evenly spread through the flame envelope of the combustion process. Intense heat from high energy photons of the NO related processes that would normally generate especially localized high temperatures would be carried away and spread to other locations of the flame decreasing both the intensity of temperature of local hot spots and the length of time those spots remain hot, significantly affecting the amount of production of NO which requires very high temperatures over a relatively long time. The molecules of the current fuel additive through fluorescence transfer such heat at the speed of light whereas normally heat would be transferred considerably slower at about the speed of sound. These molecules absorb high energy photons produced by the any of the NO, CN, NH, CH or OH reactions and then re-radiate photons at lower energies. Since these $Fe_2O_3$ molecules are located throughout the flame they help to reduce the very high temperatures peak temperatures inside the flame envelope at very high speeds compared to a flame with no catalyst additives, subsequently reducing production NH, CN, CH and/or OH radicals and subsequently lowering NOx in the exhaust. Photons travel at the speed of light whereas thermally energy is normally spread inside the flame envelope at about the speed of sound. The spectral lines represent the energy re-radiated by iron atoms which wavelengths are of energy levels lower than the energy they absorb with the entire molecular fluorescence lifetime, from excitation to emission, being measured in only billionths of a second. Each molecule of the additive of the current invention can absorb and re-emit photons many hundreds to thousands of times before becoming photo-bleached.

Ideally the catalyst metal iron would have a continuous spectrum absorbing photons of any wavelength from about 200 to 600 nm to provide the maximum reduction of NOx. However, there are large gaps in the emission spectrum of iron in the wavelengths from 365 to 390 nm, 445-510 nm and 540-570 nm reducing the potential efficiency of the catalyst to reduce NOx. For purposes of the definition a metal, metal oxide or metal compound will be referred to as a Metal. Spectrally complementary is defined for three continuous wavelength bands from 200 to 600 nm, from 800 to 2500 nm or from 200 to 2500 nm. A Metal is spectrally complementary to a base Metal over at least one of the three wavelength bands if the base Metal has at least one continuous gap at least 25 nm wide in wavelengths with a total normalized spectral emissions of the base Metal is less than 0.0025 over the entire gap and the spectrally complementary Metal produces total normalized spectral emissions of 0.02 or greater over the same gap. An example of one metal which is spectrally complementary to iron is copper over the wavelength band of 200 to 600 nm. Metals which are spectrally active between 200 and 600 nm include but are not limited to iron, yttrium, platinum, palladium, ruthenium, osmium, copper, cesium, ytterbium, molybdenum, tantalum, manganese, rhenium, aluminum, boron, lithium, tungsten, calcium, potassium, and sodium.

Figure 6:
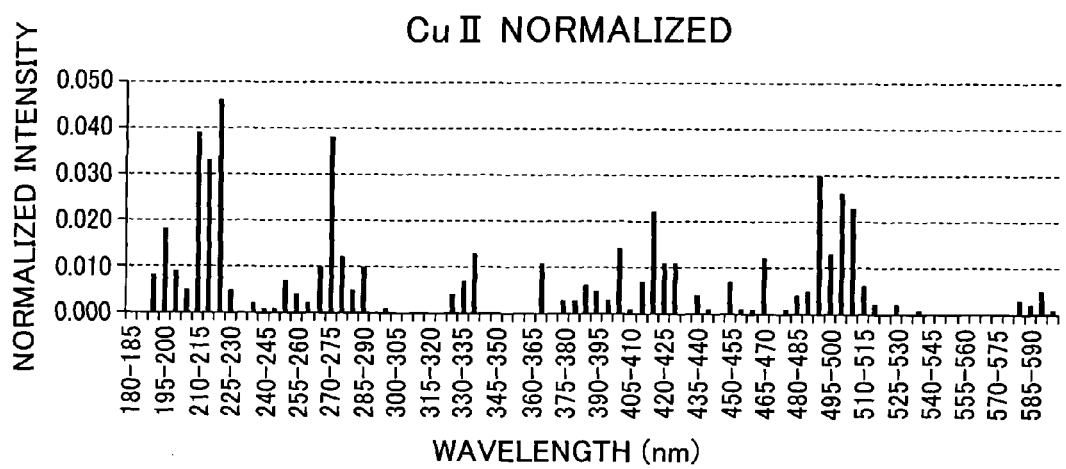
FIG. 6 is a graphical representation of normalized emission spectra for Copper II in the wavelength band from 200-600 nm.

FIG. 6 illustrates the spectral lines of copper from 180 to 600 nm. It can be noted that copper adds significant spectral emissions from 365-390 nm of normalized intensity of 0.028 and 445-510 nm with an intensity of 0.110. In one preferred embodiment of the current invention copper can be optionally added to the catalyst to improve the catalyst's ability to further reduce NOx emissions or improve combustion over a catalyst which does not include an additional metal complementary to the iron spectrum in the spectral range from 200 to 600 nm.

Figure 7:
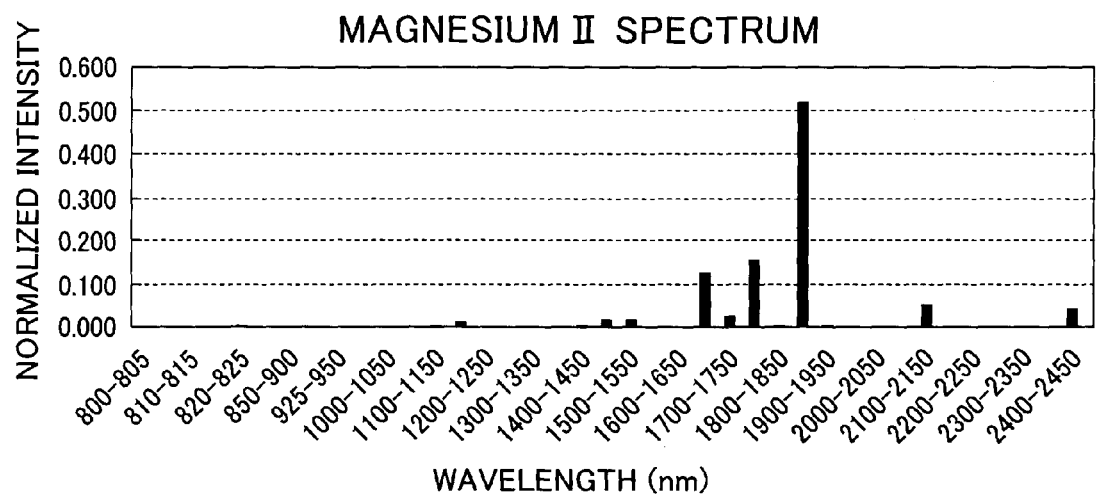
FIG. 7 is a graphical representation of normalized emission spectra for Magnesium II in the wavelength band from 800-2500 nm.

In another example of a spectrally complementary metal, copper can be used to assist the spectral action of magnesium of the current invention to provide spectral lines that assist magnesium in providing more complete combustion of the fossil fuel being used. Iron has no strong spectral emission lines below about 600 nm wavelength. Magnesium adds strong spectral lines in the lower energy region from about 1600 nm to 1900 nm. FIG. 7 represents the spectral lines of magnesium from 800 to 2500 nm. Spectral lines in this region are believed to be instrumental in providing a more even spread of temperature over the entire flame envelope and providing for more complete combustion, reducing CO and particulate emissions and improving fuel efficiency. There is a considerable gap in spectral lines for magnesium between about 800 and 1050 nm photon wavelengths.

Figure 8:
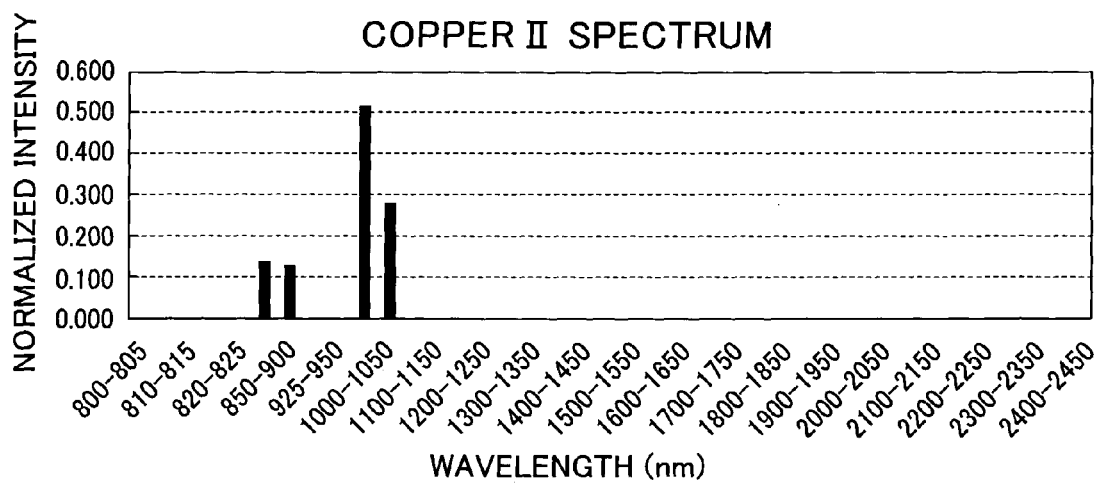
FIG. 8 is a graphical representation of normalized emission spectra for Copper II in the wavelength band from 800-2500 nm.

FIG. 8 illustrates how the metal copper provides strong spectral lines between about 825 and 1050 nm wavelengths. Over these wavelengths copper has a total normalized emission intensity of 0.107 compared to a normalized emission intensity of magnesium over the same gap of 0. This illustrates that copper is spectrally complementary to magnesium over these wavelengths. Introducing copper into the catalyst containing magnesium promotes more complete combustion. The relative wavelength band in this portion of the spectrum ranges from 800 nm to 2500 nm where the definition of spectrally complementary applies. Metals which are spectrally active between 800 and 2500 nm include but are not limited to magnesium, yttrium, strontium, copper, cesium, calcium, phosphorus, rubidium, silicon, scandium, and potassium.

In one embodiment of the current invention iron is chosen as the metal, metal oxide or metallic compound with the highest concentration with a concentration ratio of about 3-8 to the concentration of magnesium of 1 by weight. Iron is spectrally complementary to magnesium over the wavelengths between 200 and 600 nm. Likewise, magnesium is spectrally complementary to iron over the wavelengths from 800 to 2500 nm. In one embodiment Iron in the form of ferrocene is dissolved preferably in xylene and a magnesium sulfonate compound is colloidally suspended in xylene. By utilizing spectrally complementary metals, metal oxides or metallic compounds between 200 and 600 nm and/or between 800 and 2500 nm, reduction of NOx emissions, improvement of fuel efficiency, and reduction of exhaust gas pollutants such as carbon monoxide, particulates and/or other unburned carbon compounds can be realized from the fossil fuels being combusted. A third metal, metal oxide or metallic compound is chosen of copper with a concentration by weight lower than that of iron. Copper is complementary to iron over the wavelengths between 200 by weight and 600 nm and is additionally complementary to magnesium over the wavelengths 800 and 2500 nm. The metal, metal oxide or metallic compound with the highest concentration is iron in this example. Although copper was chosen as a spectrally complementary metal to iron, there are many potential other metals including but not limited to yttrium, platinum, palladium, ruthenium, osmium, tantalum, osmium, cesium, cerium, ytterbium, molybdenum, manganese, rhenium, aluminum, boron, lithium, tungsten, calcium, potassium and ruthenium which could also be used. Similarly although copper is spectrally complementary to magnesium over the wavelengths 800 to 2500 nm any of a number of other metals, metallic oxides or metallic compounds including but not limited to strontium, cesium, calcium, phosphorous, rubidium, silicon, scandium, potassium and yttrium among others are spectrally complementary metals to magnesium.

Other examples of embodiments of the current invention can be comprised of different metallic combinations to make a catalyst fuel additive of the current invention. The highest concentration by weight of any metal, metallic oxide and metallic compound used in the fuel additive is chosen from one of aluminum, antimony, magnesium, iron, molybdenum, tin, boron, bismuth, calcium, lithium, sodium, potassium, barium, manganese, silicon, copper, cadmium, cobalt, nickel, chromium, titanium, cerium, rhodium, palladium, platinum, ruthenium, silver, osmium, titanium, strontium, yttrium, zirconium, indium, tungsten, barium, phosphorus, scandium, tantalum, lanthanum, ytterbium, lutetium, rubidium, and vanadium. Two other metals, metallic oxides, or metallic compounds not necessarily selected from the above named metals can be chosen which are spectrally complementary to the metal of the highest concentration over the entire spectral range from 200 nm to 2500 nm wavelengths.

Such additives can be used to reduce NOx and/or improve at least one of carbon monoxide emissions, particulate emissions or fuel efficiency when combined with fossil fuels in one of fuel oil combustion processes, natural gas combustion processes, stationary natural gas turbines, natural gas-fired reciprocating engines, gasoline and diesel internal combustion engines, large stationary diesel engines and large stationary dual-fuel engines. Distillate fuel oil combustion processes include residential applications, commercial energy consumption, industrial applications, farm applications, electric power generation, railroad applications, vessel bunkering, military applications, and off-highway applications.

Fuel additives which contain a first metal, metal oxide or metal compound of iron dissolved in any of the previously described solvents, and at least one other metal, metal oxide or metallic compound an example of which might be magnesium which forms a colloidal suspension in the same solvent of the current invention are appropriate for use in many different applications including but not limited to fuel oil combustion processes including boilers; natural gas combustion processes including boilers, stationary natural gas turbines, natural gas fired reciprocating engines; gasoline and diesel applications in internal combustion engines, large stationary diesel engines, and large stationary dual fuel engines.

Combustion turbines using natural gas as the prime fuel are composed of three major components: compressor, combustor and power turbine. In the compressor section, ambient air is drawn in and compressed typically up to about 30 times ambient pressure and directed to the combustor section where fuel is introduced, ignited and burned as is well understood by those skilled in the art. The combustion process can be classified as diffusion flame or lean-premix staged combustion. In diffusion flame combustion the fuel/air mixing and combustion take place simultaneously in the primary combustion zone. This generates near-stoichiometric fuel/air mixtures where the temperatures are very high. For lean-premix combustors fuel and air are thoroughly mixed in an initial stage resulting in a uniform, lean, unburned fuel/air mixture which is delivered to a secondary state where the combustion reaction takes place. Combustion turbines using staged combustion are also referred to as Dry Low $NO_x$ combustors. The majority of turbines currently manufactured are lean-premix staged combustion turbines. Although levels of NOx have been steadily improved by such systems, introducing the additive of the current invention prior to or during combustion of the natural gas can further reduce the amount of NOx generated even from such low NOx combustion turbines on the order of 40% or higher reduction.

The fuel additive catalyst of the current invention presents two phenomena when used with the combustion process of natural gas. The first is the ability of the engine to produce full power at excessive oxygen levels that are below the lower flammability limit for natural gas. The second is reduction or elimination of free radical formation in the initial phases of the combustion process that lead to prompt $NO_x$ formation. Thus the fuel additive catalysts of the current invention provide a path to decrease $NO_x$ formation in combustion process of natural gas.

The fuel additive of the current invention is useful in reducing NOx and/or CO for a number of natural gas applications including: Steam generators, process heaters, combustion turbines, natural gas powered vehicles, compression ignited reciprocating engines, spark ignited reciprocating engines, natural gas compressors, combustion turbines, combined power plants used for generation of electricity, micro-turbine electrical generators, and burners whose primary fuel is natural gas. The fuel additive produces molecular sized particles of the current invention in the combustion chamber and reduces NOx and CO emissions while improving fuel efficiency.

Natural gas-fired reciprocating engines either compression ignited or spark ignited are used mostly in the natural gas industry at pipeline compressor and storage stations and at gas processing plants. These engines are used to provide mechanical shaft power for compressors and pumps. In well field applications engines are used to gather natural gas from the well field. At pipeline compressor stations, engines are used to help move natural gas from station to station. At storage facilities, they are used to injecting and extracting natural gas and to help inject the natural gas into high pressure natural gas storage fields. The catalyst of the current invention added to the natural gas prior to or during combustion allows very simple retrofit of older engines resulting in significant reduction of NOx and/or carbon monoxide while improving fuel efficiency.

Figure 9:
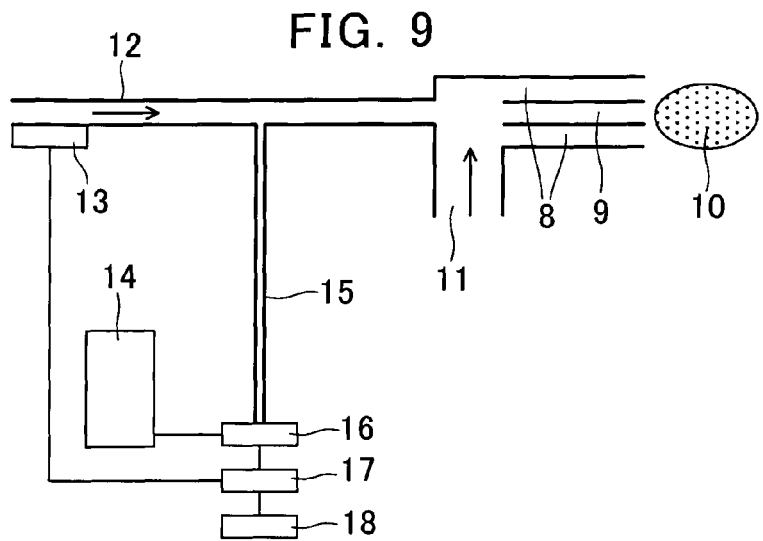
FIG. 9 is a schematic representation of a system for injecting the fuel additive into a natural gas burner.

FIG. 9 is a schematic representation of a natural gas burner of the current invention utilizing the fuel additive catalyst of the current invention. The injection of the additive into the natural gas stream is also appropriate for other kinds of combustion processes utilizing natural gas as a fuel. The natural gas inlet 12 is a pipe through which the natural gas flows to the gas burner. In the natural gas inlet 12 there is a flow sensor 13 to precisely measure the amount of gas flowing at any particular point in time. The gas flow information is automatically sent to a controller 17 which uses the input of the calculate the amount of fuel additive catalyst to introduce into the gas flow to maintain an iron level to +5% ppm by weight to be added to the fuel. Although 5% is generally accepted as a reasonable variance, depending on the circumstances this percentage could be either higher or lower than 5%. The controller 6 then sends a signal to the fuel additive catalyst pump 16 to dispense the precise amount of additive from the additive reservoir 3 required for the given gas flow. The additive line 15 is connected to a misting nozzle located in the center of the gas pipe. The nozzle injects the fine additive catalyst evenly allowing for a consistent mixing with the incoming gas. An optional operator interface 18 allows the operator to view easily the system operation for troubleshooting or system adjustment as may be necessary. The additive is then mixed with the natural gas in the inlet pipe prior to the natural gas being mixed with air. Air is introduced through the air inlet vent 11 to form the natural gas air mixture 9 and also optionally providing excess air 8 for complete combustion. The excess air and the gas fuel mixture enter the combustion zone 10 where the gas is burned. Alternatively the additive can also be injected directly into the combustion chamber. FIG. 9 is intended as a general conceptual description of one way in which the natural gas and air are mixed with the combustion catalyst of the current invention. There are any number of similar schemes which are well understood by those skilled in the art.

Combustion turbines using natural gas as the prime fuel are composed of three major components: compressor, combustor and power turbine. In the compressor section, ambient air is drawn in and compressed typically up to about 30 times ambient pressure and directed to the combustor section where fuel is introduced, ignited and burned as is well understood by those skilled in the art. The combustion process can be classified as diffusion flame or lean-premix staged combustion. In diffusion flame combustion the fuel/air mixing and combustion take place simultaneously in the primary combustion zone. This generates near-stoichiometric fuel/air mixtures where the temperatures are very high. For lean-premix combustors fuel and air are thoroughly mixed in an initial stage resulting in a uniform, lean, unburned fuel/air mixture which is delivered to a secondary state where the combustion reaction takes place. Combustion turbines using staged combustion are also referred to as Dry Low $NO_x$ combustors.

The additive of the current invention which introduces molecules of metallic catalysts into the combustion stage may be introduced into natural gas of a primary combustion zone and at least one secondary zone where the combustion process is completed. Although such combustion turbines are designed to reduce NOx, addition of the fuel additive of the current invention will reduce even further the NOx levels in the turbine exhaust. Similarly additional reduction of NOx can be obtained by using the additive of the current invention with low NOx burners utilizing flue gas recirculation in combination with staged combustion.

In the primary combustion zone, the base fuel including coal, distillate oil, low or ultra-low sulfur diesel fuel, gasified biomass, coal water slurry, and orimulsion among others is fired through conventional or low-$NO_x$ burners operating at low excess air. In this zone it is important to obtain complete combustion of the base fuel and thus produce $NO_x$ from the fuel-nitrogen, as well as prompt and thermal $NO_x$. A second fuel injection is made in the region of the furnace after the base fuel combustion creating a fuel rich reaction zone (the re-burn or re-burning zone). Here reactive radical species are produced from the re-burn fuel and these chemically react with $NO_x$ produced in the primary zone to reduce it to molecular nitrogen. The partial combustion of fuel in this re-burn zone results in high levels of carbon monoxide and a final addition of over-fire air, creating the burnout zone, completes the overall combustion process.

The easiest re-burn fuel to use is natural gas. Typically natural gas gives the greatest $NO_x$ reduction as a result of the fact that it is easy to inject and control, and that it does not contain any fuel nitrogen. Natural gas re-burn can give up to 70% reduction in $NO_x$ emission and there are additional environmental benefits from using gas as the re-burn fuel. Emissions of $SO_2$, particulate, and carbon dioxide are also reduced. When the fuel additive catalyst of the current invention is added to the natural gas prior to being introduced as the re-burn fuel, the amount of $NO_x$ can be even further reduced. The additive of the current invention can be added either to the primary fuel or to the natural gas in sufficient quantities to improve fuel efficiency and/or lower NOx and CO emissions.

Although particle sizes of the current invention can be considerably larger than molecular size and still be effective, molecular size particles are preferred to reduce ash levels inside the natural gas fuel containing the additive.

FIG. 10A through FIG. 10D illustrate the results of using exhaust gas recirculation (EGR) on a diesel engine. An experimental study was carried out to investigate the effect of EGR on emissions in a three cylinder, air cooled and constant speed direct injection diesel engine, which is typically used in agricultural farm machinery. The four graphs show the change in each of NOx FIG. 10C, Carbon Monoxide FIG. 10B, Opacity FIG. 10D and Hydrocarbon FIG. 10A emissions as the percentage of FGR changes from 0 percent 20 to 25% flue gas recirculation 19 and the engine load varies from 40 to 100 percent load. The data were published in the Journal of Engineering Research and Studies, Vol. III/Issue II/April-June, 2012, authored by J. Hussain, K. Palaniradja, and N. Algumurthi Department of Mechanical Engineering, Pondicherry Engineering College, Puducherry, India.

Figure 10A:
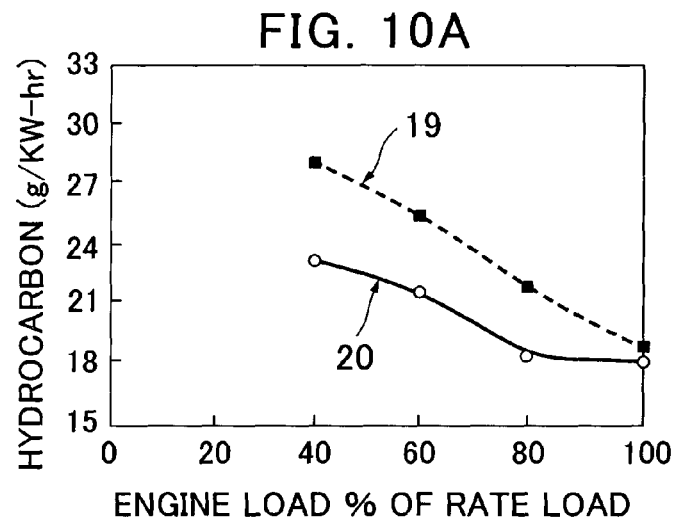
FIGS. 10A, 10B, 10C and 10D are graphical representations of the change of exhaust hydrocarbon, carbon monoxide, NOx and opacity for a small diesel engine operated with varying percentages of flue gas recirculation
Figure 10B:
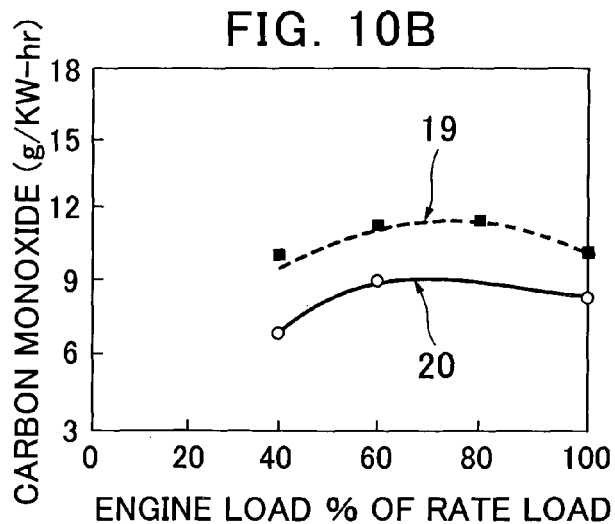
Figure 10C:
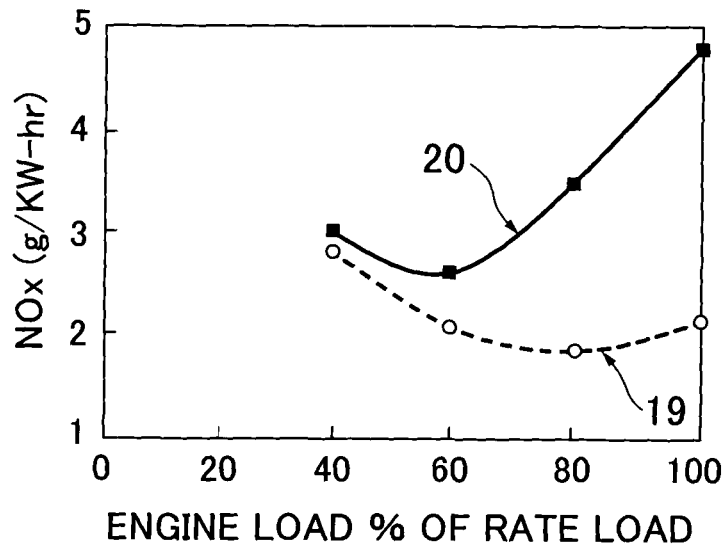
Figure 10D:
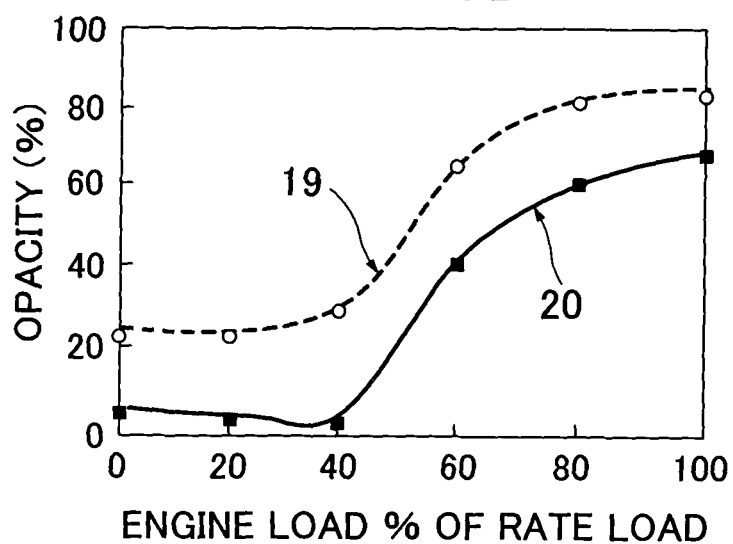

Effect of EGR on unburned hydrocarbon (HC) and carbon monoxide (CO) are shown in FIGS. 10A and B, respectively. These graphs show that HC and CO emissions increase with increasing exhaust gas recirculation (EGR). Lower excess oxygen concentration results in fuel rich air-fuel mixtures at different locations inside the combustion chamber. This heterogeneous mixture does not combust completely and results in higher hydrocarbons, and carbon monoxide emissions. At partial loads, lean mixtures are harder to ignite because of the heterogeneous nature of the mixture and produce higher amount of HC and CO indicating incomplete combustion with concurrent loss of fuel efficiency. FIG. 10C shows the main benefit of EGR in reducing NOx emissions from a diesel engine. The degree of reduction in NOx at higher loads is higher. The reasons for reduction in NOx emissions using EGR in diesel engines are reduced oxygen concentration and decreased flame temperatures in the combustible mixture. At the partial loads, O2 is available in sufficient quantity but at high loads, O2 reduces drastically, therefore NOx is reduced more at higher loads compared to partial loads. In one embodiment of the current invention the fuel additive is added to any combustion process currently utilizing EGR. By doing so, the amount of exhaust gas recirculation can be lowered subsequently providing the same NOx reduction without the large increases in other pollutants such as carbon monoxide and particulates as well as decreased fuel efficiency. Thus the fuel additive of the current invention used with exhaust gas recirculation designed to lower NOx can provide more complete combustion and allow for improved fuel efficiency compared to exhaust gas recirculation alone.

As is well known by those skilled in the art, selective catalytic reduction (SCR) of NOx in the exhaust of combustion processes is one of the preferred means to reduce NOx from the exhaust after that NOx has already been produced by the combustion process. Ammonia is used to reactwith NOx when mixed with exhaust gas in the presence of a catalyst bed. However, SCR's are well known to be temperature limited causing a phenomenon known as ammonia slip when the exhaust temperatures are below about 450° F. or above about 850° F. when the ammonia exits the engine mixed with the exhaust a phenomenon known as "ammonia slip". The catalyst of the current invention provides additional reduction of NOx during combustion so that levels of NOx in the exhaust stream will be considerably lower before being introduced into the SCR system, significantly reducing ammonia use, ammonia slippage, and reducing NOx levels reduction to levels lower than possible using an SCR with no additive. The fuel additive works to reduce NOx at any exhaust temperature. For natural gas turbines utilizing SCR NOx reduction whose NOx reduction levels do not meet acceptable levels, introducing the fuel additive of the current invention to the natural gas before it enters the gas turbine allows a low cost and simple way to reduce NOx levels without having to rebuild the gas turbine.

What is claimed is:

1. A fuel additive comprised of more than one metal, metal oxide or metallic compound for improving combustion of fossil fuels, said fuel additive comprising:
    a first metal, metal oxide or metallic compound of iron, wherein the first metal, metal oxide or metallic compound is capable of being dissolved in a solvent and has a spectral intensity with at least one continuous gap that is at least 25 nm wide in wavelengths and a total normalized spectral emissions of less than 0.0025 over the gap in the spectral intensity of the first metal, metal oxide or metallic compound of iron;
    a second metal, metal oxide or metallic compound of magnesium, wherein the second metal, metal oxide or metallic compound is over based and is capable of forming a colloidal suspension in the solvent and has a spectral intensity with at least one continuous gap that is at least 25 nm wide in wavelengths and a total normalized spectral emissions of less than 0.0025 over the gap in spectral intensity of the second metal, metal oxide or metallic compound; and
    a third metal, metal oxide or metal compound which produces total normalized spectral emissions of 0.02 or greater over the normalized spectral emissions gap of the first metal, metal oxide or metal compound or of the second metal, metal oxide or metal compound, or of both;
wherein fuel additive particles introduced into the combustion chamber of said fossil fuels are of molecular particle size.

2. A fuel additive of claim 1 wherein at least 50% of said fuel additive particles are of molecular size.

3. A fuel additive of claim 1 wherein more than one said metal, metal oxide or metallic compound are chosen from the metals consisting of aluminum, magnesium, iron, tin, cerium, manganese, copper, cobalt, nickel, palladium and platinum.

4. A fuel additive comprised of a least three metals, metal oxides or metallic compounds for improving combustion of fossil fuels wherein the metal, metal oxide or metallic compound with the highest concentration by weight is iron and wherein the said at least two additional metals are chosen from the group consisting of aluminum, magnesium, iron, tin, cerium, manganese, copper, cobalt, nickel, palladium and platform; wherein said at least two additional metals are spectrally complementary to the metal of highest concentration over the wavelength bands of 200 nm to 2500 nm by each producing total normalized spectral emissions of 0.02 or greater over a normalized spectral emissions gap of the first metal, metal oxide or metallic compound.

5. A fuel additive of claim 1 wherein a third metal, metal oxide or metal compound is added which is spectrally complementary with either iron or magnesium or both over the wave length bands from 200 nm to 2500 nm.

6. A fuel additive of claim 1 wherein said solvent is chosen from one of toluene, hexanol, octanol, xylene, kerosene, fuel oil, naphtha, and petroleum spirits or their equivalents.

7. A fuel additive of claim 1 wherein said solvent is xylene.

8. A fuel additive of claim 1 wherein said solvent is Aromatic 150.

9. A fuel additive of claim 4 wherein the fossil fuel is used in one of fuel oil combustion processes, natural gas combustion processes, stationary natural gas turbines, natural gas-fired reciprocating engines, gasoline and diesel internal combustion engines, large stationary diesel engines and large stationary dual-fuel engines.

10. A fuel additive of claim 9 wherein fuel oil combustion processes include the use of distillate fuel oil which processes includes residential applications, commercial energy consumption, industrial applications, farm applications, electric power generation, railroad applications, vessel bunkering military applications, and off-highway applications.

11. A fuel additive of claim 1 wherein the concentration of said metals in the fuel is greater than about 0.1 PPM and less than about 15 PPM by weight.

12. A fuel additive of claim 1 wherein said the first metallic compound includes dicyclopentadienyl $Fe^\circ$, cyclopentadienyl triscarbonyl $Fe^\circ$ and iron salts of carboxylic acids.

13. A fuel additive of claim 1 wherein said first metallic compound of iron is ferrocene.

14. A fuel additive of claim 1 further comprising metallic ash content and wherein said metallic ash content added to said fossil fuels is greater than about 0.5 PPM and less than about 15 PPM by weight.

15. A fuel additive of claim 1 wherein the third metal, metal oxide or metallic compound is spectrally complementary to either iron or magnesium or both over the spectral wavelength band from 200 to 2500 nm, wherein the concentration by weight of said additional metal, metal oxide, or metallic compound is less than iron.

16. A fuel additive of claim 15 wherein the third metal, metallic oxide or metallic compound is copper dissolved in or forming a colloidal suspension in said solvent.

17. A fuel additive of claim 1 wherein said iron compound is dissolved in xylene.

18. A fuel additive of claim 1 wherein said iron compound is dissolved in a naphtha solvent with a flash point between about 108 degrees F. and 200 degrees F.

19. A fuel additive of claim 1 wherein the over-based magnesium compound is a magnesium sulfonate or carboxylate.

20. A fuel additive of claim 1 where magnesium is added to the concentration of iron in a ratio of about 3-8 parts iron to about 1 part magnesium compound by weight.

21. A fuel additive of claim 15 wherein the concentration of copper by weight is less than that of iron.

22. A fuel additive of claim 1 wherein the fossil fuel includes distillate fuel oil, gasoline, natural gas and coal.

23. A fuel additive of claim 22 wherein the distillate fuel oil for use in combustion processes includes residential applications, commercial energy consumption, industrial applications, farm applications, electric power generation, railroad applications, vessel bunkering, military applications, and off-highway applications.

24. A fuel additive of claim 1 whereby said fuel additive provides a decrease in NOx emissions from the fossil fuel into which it is mixed when combusted in said fossil fuels.

25. A fuel additive of claim 1 whereby said fuel additive provides an increase in fuel efficiency when combusted in said fossil fuel.

26. A fuel additive of claim 24 used together with Selective Catalytic Reduction of NOx to provide additional improvement in NOx compared to Selective Catalytic Reduction technology alone.

27. A fuel additive of claim 24 whereby the fuel additive provides at least one of a decrease of CO emissions and/or a decrease of particulate emissions when combusted in said fossil fuel.

28. A fuel additive of claim 24 used in combination with exhaust gas recirculation NOx reduction technology to provide more complete combustion improvement compared to exhaust gas recirculation alone.

29. A fuel additive of claim 1 wherein the fossil fuel is used in one of distillate fuel oil combustion processes, natural gas combustion processes, stationary natural gas turbines, natural gas-fired reciprocating engines, gasoline and diesel internal combustion engines, large stationary diesel engines and large stationary dual-fuel engines.

30. A fuel additive of claim 22 wherein said fossil fuels include low or ultra-low sulfur content diesel fuel or distillate fuel oil.

31. A fuel additive of claim 26 wherein a lubricity agent is added to said fuel additive wherein the lubricity of the fuel after addition of said lubricity agent has an ASTM D 6079 HFRR average wear scar diameter not greater than 400 microns.

32. A fuel additive of claim 31 wherein the average wear scar diameter is not greater than 270 microns.

33. A fuel additive of claim 30 wherein said low or ultra-low sulfur content diesel or distillate fuel oil is used in one of fuel oil combustion processes, diesel internal combustion engines, large stationary diesel engines and large stationary dual-fuel engines.

34. Steam generators, process heaters, combustion turbines, vehicles, compression ignited combustion reciprocating engines, spark ignited reciprocating engines, natural gas compressors, turbines, combined power plants used for generation of electricity, micro-turbine electrical generators, compressors and burners whose primary fuel is natural gas wherein the fuel additive of claim 1 is added to the fuel natural gas prior to or during combustion.

35. Pumps using natural gas as their primary fuel to move natural gas in pipeline applications to include but not limited to gathering natural gas from the well field, moving natural gas through main pipelines and/or injecting and extracting natural gas from the gas storage facilities wherein the fuel additive catalyst of claim 1 is added to the natural gas prior to or during combustion.

36. A combustion turbine whose primary fuel is natural gas utilizing staged combustion wherein a portion of the natural gas containing the fuel additive catalyst of claim 1 is introduced into a primary combustion zone and the remainder is introduced into at least one secondary zone where combustion is completed.

37. Low NOx, lean mix combustion turbines whose primary fuel is natural gas wherein the fuel additive of claim 1, added to the natural gas prior to or during combustion, reduces the NOx produced by said combustion turbines by 40% or more.

38. A natural gas combustion process comprising a burner and utilizing the fuel additive of claim 24 whereby the burner utilizes fuel induced exhaust gas recirculation.

39. A burner whose primary fuel is natural gas utilizing fuel gas recirculation in combination with staged combustion whereby the combustion catalyst fuel additive of claim 1 is introduced into the natural gas prior to or during combustion.

40. A low-NOx burner or combustion turbine using natural gas as a primary fuel and utilizing an SCR to reduce the amount of NOx generated by the low-NOx burner wherein a catalyst fuel additive of claim 1 is introduced into the natural gas prior to entering the low-NOx burner or combustion turbine.

41. A low-NOx burner using a primary fuel including one of coal, distillate oil, low or ultra-low surfur diesel oil, gasified biomass, coal water slurry, orimulsion, or others than natural gas and using natural gas as a re-burn fuel added to the combustion process wherein a catalyst fuel additive of claim 1 is introduced into the natural gas re-burn stream prior to its use as a re-burn fuel.

42. A misting nozzle used to introduce the fuel additive of claim 1 together with its carrier solvent into a conduit of flowing natural gas prior to the gas entering the combustion chamber.

43. A combustion fuel composition comprising: (a) a combustion fuel; and (b) a combustion catalyst additive which comprises (i) an oil-soluble organometallic iron compound having a spectral intensity with at least one continuous gap that is at least 25 nm wide in wavelengths and a total normalized spectral emissions of less than 0.0025 over the gap in spectral intensity of the first metal, metal oxide or metal compound; (ii) an over-based oil-soluble organometallic magnesium compound having a spectral intensity with at least one continuous gap that is at least 25 nm wide in wavelengths and a total normalized spectral emissions of less than 0.0025 over the gap in spectral intensity of the second metal, metal oxide or metal compound; and (iii) a third oil-soluble organometallic compound selected from the group consisting of organic compounds of cerium, copper, platinum, palladium, cobalt, nickel and manganese, wherein iron from the oil-soluble organometallic iron compound is present in an amount equal to or less than 8 ppm by weight, based on the total weight of the combustion fuel composition and wherein the third oil-soluble organometallic compound produces total normalized spectral emissions of 0.02 or greater over the normalized spectral emissions gap of the first metal, metal oxide or metal compound or of the second metal, metal oxide or metal compound, or of both.

44. The combustion fuel composition of claim 43, wherein 100% of the particulate size of the material is less than $0.02 \times 10^{-6}$ meters and 50% is less than $0.0075 \times 10^{-6}$ meters.

45. The combustion fuel composition of claim 43, wherein the third metal is spectrally complementary with either or both of iron (III) and magnesium (II) over the wavelength bands from 200 nanometers (2,000 Å) and 2,500 nanometers (25,000 Å).

46. The combustion fuel composition of claim 43, wherein the total concentration of metals from (i), (ii) and (iii) in the combustion catalyst additive is from 0.1% to 10% by weight, based on the total weight of the combustion catalyst additive.

47. The combustion fuel composition of claim 43 wherein the total concentration of metals from (i), (ii) and (iii) in the combustion fuel composition is from 0.1 ppm to 10 ppm by weight, based on the total weight of the combustion fuel composition.

48. The combustion fuel composition of claim 43, wherein the oil-soluble organometallic iron compound is selected from the group consisting of dicyclopentadienyl Fe(0) and the salt of a C9 to C12 alkyl carboxylic acid.

49. The combustion fuel composition of claim 43, wherein the over-based oil-soluble organometallic magnesium compound is an over-based magnesium sulfonate or carboxylate having a maximum particle size less than $0.02 \times 10^{-6}$ meters.

50. The combustion fuel composition of claim 43, wherein the third oil-soluble organometallic compound is selected from the group consisting of oil-soluble salts of an organic acid.

51. The combustion fuel composition of claim 43 wherein the fuel is a fossil fuel.

52. The combustion fuel composition of claim 51 wherein the fuel further comprises one or more selected from the group consisting of ethanol, bio-ethanol, fatty acid methyl esters (FAME) and ligno-cellulosic ethanol.

53. A method for formulating a combustion fuel comprising:
(a) selecting one or more oil-soluble organo-metallic compounds;
(b) determining or measuring the atomic emission spectrum of the metals in the one or more oil-soluble organometallic compounds;
(c) comparing the atomic emission spectrum from step (b) to atomic emission spectra of iron (III) and magnesium (II);
(d) if the atomic emission spectrum from step (b) contains peaks not present in the atomic emission spectra of at least one of iron (III) and magnesium (II) such that the normalized spectral emission from step (b) is 0.02 or greater over that of at least one of iron (III) and magnesium (II), formulating a combustion catalyst fuel additive which comprises an oil-soluble organometallic iron compound, an over-based oil-soluble organometallic magnesium compound and the oil-soluble organometallic compound, wherein the third oil-soluble organometallic compound is spectrally complementary either with the oil-soluble organometallic iron compound or with the over-based oil-soluble organometallic magnesium compound or with both;
(e) adding the combustion catalyst fuel additive to a combustion fuel, wherein the oil-soluble organometallic iron compound is present in the fuel at an amount equal to or less than 8 ppm by weight.

54. A natural gas fuel composition comprising: (a) natural gas; (b) a natural gas combustion catalyst additive which comprises (i) an oil-soluble organometallic iron compound having a spectral intensity with at least one continuous gap that is at least 25 nm wide in wavelengths and a total normalized spectral emission of less than 0.0025 over the gap in spectral intensity of the oil-soluble organometallic iron compound, (ii) an over-based oil-soluble organometallic magnesium compound having a spectral intensity with at least one continuous gap that is at least 25 nm wide in wavelengths and a total normalized spectral emissions of less than 0.0025 over the gap in spectral intensity of the over-based oil-soluble organometallic magnesium compound, and (iii) a third oil-soluble organometallic compound selected from the group consisting of cerium, copper, platinum, palladium, cobalt, nickel and manganese, wherein the third oil-soluble organometallic compound is spectrally complementary either with the oil-soluble organometallic iron compound or with the over-based oil-soluble organometallic magnesium compound or with both, wherein the iron from the oil-soluble organometallic iron compound is present in an amount equal to or less than 8 ppm by weight, based on the total weight of the natural gas fuel composition and wherein the third oil-soluble organometallic compound produces total normalized spectral emissions of 0.02 or greater over the normalized spectral emissions gap of the oil-soluble organometallic iron compound or of the over-based oil-soluble organometallic magnesium compound, or both.

55. The natural gas fuel composition of claim 54, wherein 100% of the particulate size of the material is less than 0.02×10-6 meters and 50% is less than 0.0075×10-6 meters.

56. The natural gas fuel composition of claim 55, wherein the third metal is spectrally complementary with either or both of iron (III) and magnesium (II) over the wavelength bands from 200 nanometers (2,000 Å) and 2,500 nanometers (25,000 Å).

57. The natural gas fuel composition of claim 55, wherein the total concentration of metals from (a), (b) and (c) in the fuel additive is from 0.1% to 10% by weight, based on the total weight of the combustion catalyst additive.

58. The natural gas fuel composition of claim 55, wherein the oil-soluble organometallic iron compound is selected from the group consisting of dicyclopentadienyl Fe(0) and the salt of a C9 to C12 alkyl carboxylic acid.

59. The natural gas fuel composition of claim 55, wherein the oil-soluble organometallic magnesium compound is an over-based magnesium sulfonate or carboxylate having a maximum particle size less than 0.02×10-6 meters.

60. The natural gas fuel composition of claim 55, wherein the third oil-soluble organometallic compound is selected from the group consisting of oil-soluble salts of an organic acid.

61. A method of making a natural gas fuel composition comprising:
(a) selecting a natural gas combustion catalyst additive which comprises an oil-soluble organometallic iron compound, having a spectral intensity with at least one continuous gap that is at least 25 nm wide in wavelengths and a total normalized spectral emission of less than 0.0025 over the gap in the spectral intensity of the oil-soluble organometallic iron compound, an over-based oil-soluble organometallic magnesium compound having a spectral intensity with at least one continuous gap that is at least 25 nm wide in wavelengths and a total normalized spectral emissions of less than 0.0025 over the gap in spectral intensity of the over-based organometallic magnesium, a third oil-soluble organometallic compound selected from the group consisting of organic compounds of cerium, copper, platinum, palladium, cobalt, nickel and manganese, and a solvent selected from the group consisting of xylene, toluene, benzene and combinations thereof, wherein the oil-soluble iron (III) compound is present in an amount equal to or less than 8 ppm by weight and wherein the third oil-soluble organometallic compound is spectrally complementary either with the oil-soluble organometallic iron compound or with the over-based oil-soluble organometallic magnesium compound or with both and wherein the third oil-soluble organometallic compound produces total normalized spectral emissions of 0.02 or greater over the normalized spectral emissions gap of the oil-soluble organometallic iron compound or of the over-based organometallic magnesium compound, or of both;
(b) providing natural gas in a container; and
(c) atomizing the natural gas combustion catalyst additive into the container.

\* \* \* \* \*